(12) United States Patent
Adest et al.

(10) Patent No.: US 8,289,742 B2
(45) Date of Patent: Oct. 16, 2012

(54) PARALLEL CONNECTED INVERTERS

(75) Inventors: Meir Adest, Raanana (IL); Guy Sella, Bitan Aharon (IL); Lior Handelsman, Givataim (IL); Yoav Galin, Raanana (IL); Amir Fishelov, Tel Aviv (IL); Meir Gazit, Ashkelon (IL); Tzachi Glovinski, Petah Tikva (IL); Yaron Binder, Haifa (IL)

(73) Assignee: Solaredge Ltd., Herzelia (IL)

( * ) Notice: Subject to any disclaimer, the term of this patent is extended or adjusted under 35 U.S.C. 154(b) by 617 days.

(21) Appl. No.: 12/329,520

(22) Filed: Dec. 5, 2008

(65) Prior Publication Data

US 2009/0147554 A1 Jun. 11, 2009

Related U.S. Application Data

(60) Provisional application No. 60/992,589, filed on Dec. 5, 2007.

(51) Int. Cl.
*H02M 7/44* (2006.01)
(52) U.S. Cl. .......................................................... 363/71
(58) Field of Classification Search ................... 363/65, 363/71, 72
See application file for complete search history.

(56) References Cited

U.S. PATENT DOCUMENTS

| | | |
|---|---|---|
| 3,369,210 A | 7/1965 | Manickella |
| 3,596,229 A | 7/1971 | Hohorst |
| 4,060,757 A | 11/1977 | McMurray |
| 4,101,816 A | 7/1978 | Shepter |
| 4,171,861 A | 10/1979 | Hohorst |
| 4,452,867 A | 6/1984 | Conforti |
| 4,460,232 A | 7/1984 | Sotolongo |
| 4,481,654 A | 11/1984 | Daniels et al. |
| 4,598,330 A | 7/1986 | Woodworth |
| 4,623,753 A | 11/1986 | Feldman et al. |
| 4,637,677 A | 1/1987 | Barkus |
| 4,641,042 A | 2/1987 | Miyazawa |
| 4,641,079 A | 2/1987 | Kato et al. |
| 4,644,458 A * | 2/1987 | Harafuji et al. ................. 363/65 |
| 4,652,770 A | 3/1987 | Kumano |
| 4,783,728 A | 11/1988 | Hoffman |
| RE33,057 E | 9/1989 | Clegg et al. |
| 4,868,379 A | 9/1989 | West |
| 4,888,063 A | 12/1989 | Powell |
| 4,888,702 A | 12/1989 | Gerken et al. |

(Continued)

FOREIGN PATENT DOCUMENTS

DE 19737286 3/1999

(Continued)

OTHER PUBLICATIONS

Alonso, R., "A New Distributed Converter Interface for PV Panels," 20th European Photovoltaic Solar Energy Conference, Jun. 6-10, 2005, Barcelona, Spain. pp. 2288-2291.

(Continued)

*Primary Examiner* — Adolf Berhane
(74) *Attorney, Agent, or Firm* — Banner & Witcoff, Ltd.

(57) ABSTRACT

A distributed power system wherein a plurality of power converters are connected in parallel and share the power conversion load according to a prescribed function, but each power converter autonomously determines its share of power conversion. Each power converter operates according to its own power conversion formula/function, such that overall the parallel-connected converters share the power conversion load in a predetermined manner.

15 Claims, 7 Drawing Sheets

U.S. PATENT DOCUMENTS

| | | | |
|---|---|---|---|
| 4,899,269 A | 2/1990 | Rouzies | |
| 4,903,851 A | 2/1990 | Slough | |
| 4,987,360 A | 1/1991 | Thompson | |
| 5,045,988 A | 9/1991 | Gritter et al. | |
| 5,081,558 A | 1/1992 | Mahler | |
| 5,191,519 A * | 3/1993 | Kawakami | 363/71 |
| 5,280,232 A | 1/1994 | Kohl et al. | |
| 5,327,071 A | 7/1994 | Frederick et al. | |
| 5,345,375 A | 9/1994 | Mohan | |
| 5,402,060 A | 3/1995 | Erisman | |
| 5,446,645 A * | 8/1995 | Shirahama et al. | 363/71 |
| 5,460,546 A | 10/1995 | Kunishi et al. | |
| 5,493,154 A | 2/1996 | Smith et al. | |
| 5,497,289 A | 3/1996 | Sugishima et al. | |
| 5,517,378 A | 5/1996 | Asplund et al. | |
| 5,548,504 A | 8/1996 | Takehara | |
| 5,604,430 A | 2/1997 | Decker et al. | |
| 5,616,913 A | 4/1997 | Litterst | |
| 5,644,219 A | 7/1997 | Kurokawa | |
| 5,646,501 A | 7/1997 | Fishman et al. | |
| 5,659,465 A | 8/1997 | Flack et al. | |
| 5,686,766 A | 11/1997 | Tamechika | |
| 5,773,963 A | 6/1998 | Blanc et al. | |
| 5,780,092 A | 7/1998 | Agbo et al. | |
| 5,798,631 A | 8/1998 | Spee et al. | |
| 5,801,519 A | 9/1998 | Midya et al. | |
| 5,804,894 A | 9/1998 | Leeson et al. | |
| 5,821,734 A | 10/1998 | Faulk | |
| 5,822,186 A | 10/1998 | Bull et al. | |
| 5,838,148 A | 11/1998 | Kurokami et al. | |
| 5,869,956 A | 2/1999 | Nagao et al. | |
| 5,873,738 A | 2/1999 | Shimada et al. | |
| 5,886,890 A | 3/1999 | Ishida et al. | |
| 5,892,354 A | 4/1999 | Nagao et al. | |
| 5,905,645 A * | 5/1999 | Cross | 363/65 |
| 5,919,314 A | 7/1999 | Kim | |
| 5,923,158 A | 7/1999 | Kurokami et al. | |
| 5,932,994 A | 8/1999 | Jo et al. | |
| 5,933,327 A | 8/1999 | Leighton et al. | |
| 5,945,806 A | 8/1999 | Faulk | |
| 5,949,668 A * | 9/1999 | Schweighofer | 363/71 |
| 5,963,010 A | 10/1999 | Hayashi et al. | |
| 5,990,659 A | 11/1999 | Frannhagen | |
| 6,031,736 A | 2/2000 | Takehara et al. | |
| 6,038,148 A | 3/2000 | Farrington et al. | |
| 6,046,919 A | 4/2000 | Madenokouji et al. | |
| 6,050,779 A | 4/2000 | Nagao et al. | |
| 6,078,511 A | 6/2000 | Fasullo et al. | |
| 6,081,104 A | 6/2000 | Kern | |
| 6,082,122 A | 7/2000 | Madenokouji et al. | |
| 6,105,317 A | 8/2000 | Tomiuchi et al. | |
| 6,111,188 A | 8/2000 | Kurokami et al. | |
| 6,111,391 A | 8/2000 | Cullen | |
| 6,111,767 A | 8/2000 | Handleman | |
| 6,163,086 A | 12/2000 | Choo | |
| 6,166,455 A | 12/2000 | Li | |
| 6,166,527 A | 12/2000 | Dwelley et al. | |
| 6,169,678 B1 | 1/2001 | Kondo et al. | |
| 6,219,623 B1 | 4/2001 | Wills | |
| 6,255,360 B1 | 7/2001 | Domschke et al. | |
| 6,259,234 B1 | 7/2001 | Perol | |
| 6,262,558 B1 | 7/2001 | Weinberg | |
| 6,285,572 B1 | 9/2001 | Onizuka et al. | |
| 6,301,128 B1 | 10/2001 | Jang et al. | |
| 6,304,065 B1 | 10/2001 | Wittenbreder | |
| 6,320,769 B2 | 11/2001 | Kurokami et al. | |
| 6,339,538 B1 | 1/2002 | Handleman | |
| 6,351,130 B1 | 2/2002 | Preiser et al. | |
| 6,369,462 B1 | 4/2002 | Siri | |
| 6,380,719 B2 | 4/2002 | Underwood et al. | |
| 6,396,170 B1 * | 5/2002 | Laufenberg et al. | 307/64 |
| 6,433,522 B1 | 8/2002 | Siri | |
| 6,448,489 B2 | 9/2002 | Kimura et al. | |
| 6,452,814 B1 | 9/2002 | Wittenbreder | |
| 6,493,246 B2 | 12/2002 | Suzui et al. | |
| 6,507,176 B2 | 1/2003 | Wittenbreder, Jr. | |
| 6,531,848 B1 | 3/2003 | Chitsazan et al. | |
| 6,545,211 B1 | 4/2003 | Mimura | |
| 6,548,205 B2 | 4/2003 | Leung et al. | |
| 6,590,793 B1 | 7/2003 | Nagao et al. | |
| 6,593,521 B2 | 7/2003 | Kobayashi | |
| 6,608,468 B2 | 8/2003 | Nagase | |
| 6,611,441 B2 | 8/2003 | Kurokami et al. | |
| 6,628,011 B2 | 9/2003 | Droppo et al. | |
| 6,650,031 B1 | 11/2003 | Goldack | |
| 6,650,560 B2 | 11/2003 | MacDonald et al. | |
| 6,653,549 B2 | 11/2003 | Matsushita et al. | |
| 6,672,018 B2 | 1/2004 | Shingleton | |
| 6,678,174 B2 | 1/2004 | Suzui et al. | |
| 6,690,590 B2 | 2/2004 | Stamenic et al. | |
| 6,738,692 B2 | 5/2004 | Schienbein et al. | |
| 6,765,315 B2 | 7/2004 | Hammerstrom et al. | |
| 6,768,047 B2 | 7/2004 | Chang et al. | |
| 6,788,033 B2 | 9/2004 | Vinciarelli | |
| 6,795,318 B2 | 9/2004 | Haas et al. | |
| 6,801,442 B2 | 10/2004 | Suzui et al. | |
| 6,850,074 B2 | 2/2005 | Adams et al. | |
| 6,882,131 B1 | 4/2005 | Takada et al. | |
| 6,914,418 B2 | 7/2005 | Sung | |
| 6,919,714 B2 | 7/2005 | Delepaut | |
| 6,927,955 B2 | 8/2005 | Suzui et al. | |
| 6,933,627 B2 | 8/2005 | Wilhelm | |
| 6,936,995 B2 | 8/2005 | Kapsokavathis et al. | |
| 6,950,323 B2 | 9/2005 | Achleitner et al. | |
| 6,963,147 B2 | 11/2005 | Kurokami et al. | |
| 6,984,967 B2 | 1/2006 | Notman | |
| 6,984,970 B2 | 1/2006 | Capel | |
| 7,030,597 B2 | 4/2006 | Bruno et al. | |
| 7,031,176 B2 | 4/2006 | Kotsopoulos et al. | |
| 7,042,195 B2 | 5/2006 | Tsunetsugu et al. | |
| 7,046,531 B2 | 5/2006 | Zocchi et al. | |
| 7,053,506 B2 | 5/2006 | Alonso et al. | |
| 7,072,194 B2 | 7/2006 | Nayar et al. | |
| 7,079,406 B2 | 7/2006 | Kurokami et al. | |
| 7,087,332 B2 | 8/2006 | Harris | |
| 7,090,509 B1 | 8/2006 | Gilliland et al. | |
| 7,091,707 B2 | 8/2006 | Cutler | |
| 7,097,516 B2 | 8/2006 | Werner et al. | |
| 7,126,053 B2 | 10/2006 | Kurokami et al. | |
| 7,126,294 B2 | 10/2006 | Minami et al. | |
| 7,138,786 B2 | 11/2006 | Ishigaki et al. | |
| 7,148,669 B2 | 12/2006 | Maksimovic et al. | |
| 7,158,359 B2 | 1/2007 | Bertele et al. | |
| 7,158,395 B2 | 1/2007 | Deng et al. | |
| 7,174,973 B1 | 2/2007 | Lysaght | |
| 7,193,872 B2 | 3/2007 | Siri | |
| 7,218,541 B2 | 5/2007 | Price et al. | |
| 7,248,946 B2 | 7/2007 | Bashaw et al. | |
| 7,256,566 B2 | 8/2007 | Bhavaraju et al. | |
| 7,277,304 B2 * | 10/2007 | Stancu et al. | 363/71 |
| 7,282,814 B2 | 10/2007 | Jacobs | |
| 7,291,036 B1 | 11/2007 | Daily et al. | |
| RE39,976 E | 1/2008 | Schiff et al. | |
| 7,336,056 B1 | 2/2008 | Dening | |
| 7,352,154 B2 | 4/2008 | Cook | |
| 7,371,963 B2 | 5/2008 | Suenaga et al. | |
| 7,372,712 B2 * | 5/2008 | Stancu et al. | 363/71 |
| 7,385,380 B2 | 6/2008 | Ishigaki et al. | |
| 7,385,833 B2 | 6/2008 | Keung | |
| 7,394,237 B2 | 7/2008 | Chou et al. | |
| 7,420,815 B2 | 9/2008 | Love | |
| 7,435,134 B2 | 10/2008 | Lenox | |
| 7,435,897 B2 | 10/2008 | Russell | |
| 7,471,014 B2 | 12/2008 | Lum et al. | |
| 7,504,811 B2 | 3/2009 | Watanabe et al. | |
| 7,589,437 B2 | 9/2009 | Henne et al. | |
| 7,600,349 B2 | 10/2009 | Liebendorfer | |
| 7,602,080 B1 | 10/2009 | Hadar et al. | |
| 7,605,498 B2 | 10/2009 | Ledenev et al. | |
| 7,646,116 B2 | 1/2010 | Batarseh et al. | |
| 7,719,140 B2 | 5/2010 | Ledenev et al. | |
| 7,748,175 B2 | 7/2010 | Liebendorfer | |
| 7,759,575 B2 | 7/2010 | Jones et al. | |
| 7,763,807 B2 | 7/2010 | Richter | |
| 7,780,472 B2 | 8/2010 | Lenox | |
| 7,782,031 B2 | 8/2010 | Qiu et al. | |
| 7,787,273 B2 | 8/2010 | Lu et al. | |

| | | |
|---|---|---|
| 7,804,282 B2 | 9/2010 | Bertele |
| 7,812,701 B2 | 10/2010 | Lee et al. |
| 7,839,022 B2 | 11/2010 | Wolfs |
| 7,843,085 B2 | 11/2010 | Ledenev et al. |
| 7,868,599 B2 | 1/2011 | Rahman et al. |
| 7,880,334 B2 | 2/2011 | Evans et al. |
| 7,893,346 B2 * | 2/2011 | Nachamkin et al. .......... 136/244 |
| 7,900,361 B2 | 3/2011 | Adest et al. |
| 7,919,953 B2 | 4/2011 | Porter et al. |
| 7,948,221 B2 | 5/2011 | Watanabe et al. |
| 7,952,897 B2 | 5/2011 | Nocentini et al. |
| 7,960,650 B2 | 6/2011 | Richter et al. |
| 7,960,950 B2 | 6/2011 | Glovinsky |
| 8,003,885 B2 | 8/2011 | Richter et al. |
| 8,004,116 B2 | 8/2011 | Ledenev et al. |
| 8,004,117 B2 | 8/2011 | Adest et al. |
| 8,013,472 B2 | 9/2011 | Adest et al. |
| 8,077,437 B2 | 12/2011 | Mumtaz et al. |
| 8,093,756 B2 | 1/2012 | Porter et al. |
| 8,093,757 B2 | 1/2012 | Wolfs |
| 8,111,052 B2 | 2/2012 | Glovinsky |
| 2002/0044473 A1 | 4/2002 | Toyomura et al. |
| 2002/0056089 A1 | 5/2002 | Houston |
| 2003/0058593 A1 | 3/2003 | Bertele et al. |
| 2003/0066076 A1 | 4/2003 | Minahan |
| 2003/0075211 A1 | 4/2003 | Makita et al. |
| 2003/0080741 A1 | 5/2003 | LeRow et al. |
| 2003/0214274 A1 | 11/2003 | Lethellier |
| 2004/0041548 A1 | 3/2004 | Perry |
| 2004/0125618 A1 | 7/2004 | De Rooij |
| 2004/0140719 A1 | 7/2004 | Vulih et al. |
| 2004/0169499 A1 | 9/2004 | Huang et al. |
| 2004/0201279 A1 | 10/2004 | Templeton |
| 2004/0201933 A1 | 10/2004 | Blanc |
| 2004/0246226 A1 | 12/2004 | Moon |
| 2005/0002214 A1 | 1/2005 | Deng et al. |
| 2005/0005785 A1 | 1/2005 | Poss et al. |
| 2005/0017697 A1 | 1/2005 | Capel |
| 2005/0057214 A1 | 3/2005 | Matan |
| 2005/0057215 A1 | 3/2005 | Matan |
| 2005/0068820 A1 | 3/2005 | Radosevich et al. |
| 2005/0099138 A1 | 5/2005 | Wilhelm |
| 2005/0103376 A1 | 5/2005 | Matsushita et al. |
| 2005/0162018 A1 | 7/2005 | Realmuto et al. |
| 2005/0172995 A1 | 8/2005 | Rohrig et al. |
| 2005/0226017 A1 | 10/2005 | Kotsopoulos et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0053447 A1 | 3/2006 | Krzyzanowski et al. |
| 2006/0068239 A1 | 3/2006 | Norimatsu et al. |
| 2006/0108979 A1 | 5/2006 | Daniel et al. |
| 2006/0113843 A1 | 6/2006 | Beveridge |
| 2006/0113979 A1 | 6/2006 | Ishigaki et al. |
| 2006/0118162 A1 | 6/2006 | Saelzer et al. |
| 2006/0132102 A1 | 6/2006 | Harvey |
| 2006/0149396 A1 | 7/2006 | Templeton |
| 2006/0162772 A1 | 7/2006 | Presher et al. |
| 2006/0163946 A1 | 7/2006 | Henne et al. |
| 2006/0171182 A1 | 8/2006 | Siri et al. |
| 2006/0174939 A1 | 8/2006 | Matan |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2006/0227578 A1 | 10/2006 | Datta et al. |
| 2006/0237058 A1 | 10/2006 | McClintock et al. |
| 2007/0044837 A1 | 3/2007 | Simburger et al. |
| 2007/0075711 A1 | 4/2007 | Blanc et al. |
| 2007/0081364 A1 | 4/2007 | Andreycak |
| 2007/0147075 A1 | 6/2007 | Bang |
| 2007/0159866 A1 | 7/2007 | Siri |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0227574 A1 | 10/2007 | Cart |
| 2007/0236187 A1 | 10/2007 | Wai et al. |
| 2007/0273342 A1 * | 11/2007 | Kataoka et al. ............... 323/234 |
| 2008/0024098 A1 | 1/2008 | Hojo |
| 2008/0080177 A1 | 4/2008 | Chang |
| 2008/0088184 A1 | 4/2008 | Tung et al. |
| 2008/0097655 A1 | 4/2008 | Hadar et al. |
| 2008/0106250 A1 | 5/2008 | Prior et al. |
| 2008/0115823 A1 | 5/2008 | Kinsey |
| 2008/0136367 A1 | 6/2008 | Adest et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0179949 A1 | 7/2008 | Besser et al. |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0246460 A1 | 10/2008 | Smith |
| 2008/0246463 A1 | 10/2008 | Sinton et al. |
| 2009/0039852 A1 | 2/2009 | Fishelov et al. |
| 2009/0073726 A1 | 3/2009 | Babcock |
| 2009/0084570 A1 | 4/2009 | Gherardini et al. |
| 2009/0097172 A1 | 4/2009 | Bremicker et al. |
| 2009/0102440 A1 | 4/2009 | Coles |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0190275 A1 | 7/2009 | Gilmore et al. |
| 2009/0206666 A1 | 8/2009 | Sella et al. |
| 2009/0237042 A1 | 9/2009 | Glovinski |
| 2009/0237043 A1 | 9/2009 | Glovinsky |
| 2009/0273421 A1 | 11/2009 | Cros et al. |
| 2009/0282755 A1 | 11/2009 | Abbott et al. |
| 2009/0322494 A1 | 12/2009 | Lee |
| 2010/0124027 A1 | 5/2010 | Handelsman et al. |
| 2010/0139743 A1 | 6/2010 | Hadar et al. |
| 2010/0214808 A1 | 8/2010 | Rodriguez |
| 2010/0244575 A1 | 9/2010 | Coccia et al. |
| 2010/0269430 A1 | 10/2010 | Haddock et al. |
| 2010/0282290 A1 | 11/2010 | Schwarze et al. |
| 2010/0294528 A1 | 11/2010 | Sella et al. |
| 2010/0294903 A1 | 11/2010 | Shmukler et al. |
| 2010/0297860 A1 | 11/2010 | Shmukler et al. |
| 2010/0301991 A1 | 12/2010 | Sella et al. |
| 2010/0308662 A1 | 12/2010 | Schatz et al. |
| 2011/0006743 A1 | 1/2011 | Fabbro |
| 2011/0043172 A1 | 2/2011 | Dearn |
| 2011/0084553 A1 | 4/2011 | Adest et al. |
| 2011/0114154 A1 | 5/2011 | Lichy et al. |
| 2011/0121652 A1 | 5/2011 | Sella et al. |
| 2011/0125431 A1 | 5/2011 | Adest et al. |
| 2011/0133552 A1 | 6/2011 | Binder et al. |
| 2011/0140536 A1 | 6/2011 | Adest et al. |
| 2011/0181251 A1 | 7/2011 | Porter et al. |
| 2011/0181340 A1 | 7/2011 | Gazit |
| 2011/0210611 A1 | 9/2011 | Ledenev et al. |
| 2011/0254372 A1 | 10/2011 | Haines et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0285205 A1 | 11/2011 | Ledenev et al. |
| 2011/0290317 A1 | 12/2011 | Naumovitz et al. |
| 2011/0291486 A1 | 12/2011 | Adest et al. |
| 2011/0316346 A1 | 12/2011 | Porter et al. |
| 2012/0007613 A1 | 1/2012 | Gazit |
| 2012/0032515 A1 | 2/2012 | Ledenev et al. |

FOREIGN PATENT DOCUMENTS

| | | |
|---|---|---|
| DE | 102005030907 | 1/2007 |
| DE | 102008057874 | 5/2010 |
| EP | 0419093 | 3/1991 |
| EP | 0420295 A1 | 4/1991 |
| EP | 0604777 A1 | 7/1994 |
| EP | 0756178 | 1/1997 |
| EP | 0827254 | 3/1998 |
| EP | 1330009 | 7/2003 |
| EP | 1503490 | 2/2005 |

| | | |
|---|---|---|
| EP | 1531545 A2 | 5/2005 |
| EP | 1657557 | 5/2006 |
| EP | 1657797 A1 | 5/2006 |
| EP | 1887675 | 2/2008 |
| EP | 2048679 | 4/2010 |
| ES | 2249147 | 3/2006 |
| ES | 2249149 | 3/2006 |
| GB | 2480015 A | 11/2011 |
| GB | 2480015 B | 12/2011 |
| JP | 61065320 | 4/1986 |
| JP | 11041832 | 2/1999 |
| JP | 11103538 | 4/1999 |
| JP | 2003124492 | 4/2003 |
| JP | 2003-134667 A | 5/2003 |
| JP | 2007-058845 A | 3/2007 |
| WO | WO 93/13587 A1 | 7/1993 |
| WO | WO 96/13093 A1 | 5/1996 |
| WO | 9823021 | 5/1998 |
| WO | WO 98/23021 A2 | 5/1998 |
| WO | 0000839 | 1/2000 |
| WO | 0021178 | 4/2000 |
| WO | 0075947 | 12/2000 |
| WO | 0231517 | 4/2002 |
| WO | WO 03/050938 A2 | 6/2003 |
| WO | WO 03/071655 A1 | 8/2003 |
| WO | WO 2004/023278 A2 | 3/2004 |
| WO | WO 2004/090993 A2 | 10/2004 |
| WO | 2004107543 | 12/2004 |
| WO | 2005076444 | 8/2005 |
| WO | WO 2005/076445 A1 | 8/2005 |
| WO | 2006005125 | 1/2006 |
| WO | 2006007198 | 1/2006 |
| WO | WO 2006/078685 A2 | 7/2006 |
| WO | WO 2007/006564 A2 | 1/2007 |
| WO | 2007048421 | 5/2007 |
| WO | 2007073951 | 7/2007 |
| WO | WO 2007/084196 A2 | 7/2007 |
| WO | 2007090476 | 8/2007 |
| WO | WO 2007/113358 A1 | 10/2007 |
| WO | 2008125915 | 10/2008 |
| WO | 2008132551 | 11/2008 |
| WO | 2008132553 | 11/2008 |
| WO | 2008142480 | 11/2008 |
| WO | 2009007782 | 1/2009 |
| WO | 2009051853 | 4/2009 |
| WO | 2009073868 | 6/2009 |
| WO | 2009118682 | 10/2009 |
| WO | 2009118683 | 10/2009 |
| WO | 2009136358 | 11/2009 |
| WO | 2010065043 | 6/2010 |
| WO | 2010065388 | 6/2010 |
| WO | 2010072717 | 7/2010 |
| WO | 2010134057 | 11/2010 |
| WO | 2011011711 | 1/2011 |
| WO | 2011017721 | 2/2011 |

OTHER PUBLICATIONS

Alonso, R., "Experimental Results of Intelligent PV Module for Grid-Connected PV Systems," 21st European Photovoltaic Solar Energy Conference, Sep. 4-8, 2006, Dresden, Germany.pp. 2297-2300.
Enslin, Johan H. R., "Integrated Photovoltaic Maximum Power Point Tracking Converter," IEEE Transactions on Industrial Electronics, vol. 44, No. 6, Dec. 1997. pp. 769-773.
Lindgren, Bjorn, "Topology for Decentralised Solar Energy Inverters with a Low Voltage AC-Bus," Chalmers University of Technology, Department of Electrical Power Engineering, EPE '99—Lausanne.
Nikraz, Magid, "Digital Control of a Voltage Source Inverter in Photovoltaic Applications," 2004 35th Annual IEEE Power Electronics Specialists Conference, Aachen, Germany, 2004. pp. 3266-3271.
Orduz, R., "Evaluation Test Results of a New Distributed MPPT Converter," 22nd European Photovoltaic Solar Energy Conference, Sep. 3-7, 2007, Milan, Italy.
Palma, L., "A Modular Fuel Cell, Modular DC-DC Converter Concept for High Performance and Enhanced Reliability," IEEE 2007. pp. 2633-2638.
Quaschning, Volker, "Cost Effectiveness of Shadow Tolerant Photovoltaic Systems," Berlin University of Technology, Institute of Electrical Energy Technology, Renewable Energy Section. EuroSun'96. pp. 819-824.
Roman, E., "Intelligent PV Module for Grid-Connected PV Systems," IEEE Transactions on Industrial Electronics, vol. 53, No. 4, Aug. 2006. pp. 1066-1073.
Roman, E., "Power Line Communications in Modular PV Systems," 20th European Photovoltaic Solar Energy Conference, Jun. 6-10, 2005, Barcelona, Spain. pp. 2249-2252.
Uriarte, S., "Energy Integrated Management System for PV Applications," 20th European Photovoltaic Solar Energy Conference, Jun. 6-10, 2005, Barcelona, Spain. pp. 2292-2295.
Walker, Geoffrey R., "Cascaded DC-DC Converter Connection of Photovoltaic Modules," IEEE Transactions on Power Electronics, vol. 19, No. 4, Jul. 2004. pp. 1130-1139.
International Search Report for PCT/IB2007/004610 dated Feb. 23, 2009.
International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Atsushi Kajihara, et al. "Model of Photovoltaic Cell Circuits Under Partial Shading," 2005 IEEE, pp. 866-870.
Werner Knaupp, et al., "Operation of a 10 KW PV Façade with 100 W AC Photovoltaic Modules," 1996 IEEE, 25th PVSC, May 13-17, 1996, pp. 1235-1238, Washington, D.C.
O. Alonso, et al., "Cascaded H-Bridge Multilevel Converter for Grid Connected Photovoltaic Generators with Independent Maximum Power Point Tracking of Each Solar Array," 2003 IEEE 34th, Annual Power Electronics Specialists Conference, Acapulco, Mexico, Jun. 15-19, 2003, pp. 731-735, vol. 2.
J.M.A. Myrzik, et al., "String and Module Integrated Inverters for Single-Phase Grid Connected Photovoltaic Systems—A Review," Power Tech Conference Proceedings, 2003 IEEE Bologna, Jun. 23-26, 2003 p. 8, vol. 2.
Jingquan Chen, et al., "Predictive Digital Current Programmed Control," IEEE Transactions on Power Electronics, vol. 18, Issue 1, Jan. 2003.
K. Wallace, et al, "DSP Controlled Buck/Boost Power Factor Correction for Telephony Rectifiers," Telecommunications Energy Conference, 2001. INTELEC 2001. Twenty-Third International, Oct. 18, 2001, pp. 132-138.
Control of single-stage single-phase PV inverter, to Ciobotaru, et al., Aug. 7, 2006.
International Search Report and Written Opinion for PCT/IB2007/004591 dated Jul. 5, 2010.
European Communication for EP07873361.5 dated Jul. 12, 2010.
European Communication for EP07874022.2 dated Oct. 18, 2010.
European Communication for EP07875148.4 dated Oct. 18, 2010.
Chen, et al., "A New Low-Stress Buck-Boost Converter for Universal-Input PFC Applications", IEEE Applied Power Electronics Converence, Feb. 2001, Colorado Power Electronics Center Publications.
Chen, et al., "Buck-Boost PWM Converters Having Two Independently Controlled Switches", IEEE Power Electronics Specialists Converence, Jun. 2001, Colorado Power Electronics Center Publications.
Esram, et al., "Comparison of Photovoltaic Array Maximum Power Point Tracking Techniques", IEEE Transactions on Energy Conversion, vol. 22, No. 2, Jun. 2007, pp. 439-449.
Walker, et al., "PhotoVoltaic DC-DC Module Integrated Converter for Novel Cascaded and Bypass Grid Connection Topologies-Design and Optimisation", 37th IEEE Power Electronics Specialists Converence, Jun. 18-22, 2006, Jeju, Korea.

Geoffrey R. Walker Affidavit re: U.S. Appl. No. 11/950,307.
Geoffrey R. Walker Affidavit re: U.S. Appl. No. 11/950,271.
Matsui, et al. "A New Maximum Photovoltaic Power Tracking Control Scheme Based on Power Equilibrium at DC Link", IEEE, 1999, pp. 804-809.
International Preliminary Report on Patentability for PCT/IB2008/055092 dated Jun. 8, 2010.
International Search Report for PCT/IB2008/055092 dated Sep. 8, 2009.
Hou, et al., Application of Adaptive Algorithm of Solar Cell Battery Charger, Apr. 2004.
Stamenic, et al., "Maximum Power Point Tracking for Building Integrated Photovoltaic Ventilation Systems", 2000.
International Search Report and Opinion of International Patent Application WO2009136358 (PCT/IB2009/051831), dated Sep. 16, 2009.
Informal Comments to the International Search Report dated Dec. 3, 2009.
PCT/IB2010/052287 International Search Report and Written Opinion dated Sep. 2, 2010.
UK Intellectual Property office, Combined Search and Examination Report for GB1100450.4 under Sections 17 and 18 (3), Jul. 14, 2011.
Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.
Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.
Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.
Sandia Report SAND96-2797 IUC-1290 Unlimited Release, Printed Dec. 1996, "Photovoltaic Power Systems and the National Electrical Code: Suggested Practices", by John Wiles, Southwest Technology Development Instutte New Mexico State University Las Cruces, NM.
United Kingdom Intellectual Property Office, Combined Search and Examination Report Under Sections 17 and 18(3), GB1020862.7, dated Jun. 16, 2011.
QT Technical Application Papers, "ABB Circuit-Breakers for Direct current Applications", ABB SACE S.p.A., An ABB Group Coupany, L.V. Breakers, Via Baioni, 35, 24123 Bergamo-Italy, Tel.: +39 035.395.111-Telefax: +39 035.395.306-433, Sep. 2007.
Woyte, et al., "Mains Monitoring and Protection in a European Context", 17th European Photovoltaic Solar Energy Conference and Exhibition, Munich, Germany, Oct. 22-26, 2001, ACHIM, Woyte, et al., pp. 1-4.
"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.
Fairchild Semiconductor, Application Note 9016, IGBT Basics 1, by K.S. OH Feb. 1, 2001.
"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.
Walker, "A DC Circuit Breaker for an Electric Vehicle Battery Pack", Australasian Universities Power Engineering Conference and IEAust Electric Energy Conference, Sep. 26-29, 1999.
Combined Search and Examination Report for GB1018872.0 dated Apr. 15, 2011, 2 pages.
International Search Report and Opinion of International Patent Application PCT/2009/051221, dated Oct. 19, 2009.
International Search Report and Opinion of International Patent Application PCT/2009/051222, dated Oct. 7, 2009.
Communication in EP07874025.5 dated Aug. 17, 2011.
IPRP for PCT/IB2008/055095 dated Jun. 8, 2010, with Written Opinion.
ISR for PCT/IB2008/055095 dated Apr. 30, 2009.
IPRP for PCT/IL2007/001064 dated Mar. 17, 2009, with Written Opinion dated Mar. 25, 2008.
ISR for PCT/IL07/01064 dated Mar. 25, 2008.
IPRP for PCT/IB2007/004584 dated Jun. 10, 2009, with Written Opinion.
IPRP for PCT/IB2007/004586 dated Jun. 10, 2009, with Written Opinion.
IPRP for PCT/IB2007/004591 dated Jul. 13, 2010, with Written Opinion.
IPRP for PCT/IB2007/004610 dated Jun. 10, 2009, with Written Opinion.
IPRP for PCT/IB2007/004643 dated Jun. 10, 2009, with Written Opinion.
Written Opinion for PCT/IB2008/055092 submitted with IPRP dated Jun. 8, 2010.
IPRP for PCT/US2008/085754 dated Jun. 8, 2010, with Written Opinion dated Jan. 21, 2009.
IPRP for PCT/US20081085755 dated Jun. 8, 2010, with Written Opinion dated Jan. 20, 2009.
IPRP for PCT/IB2009/051221 dated Sep. 28, 2010, with Written Opinion.
IPRP for PCT/IB2009/051222 dated Sep. 28, 2010, with Written Opinion.
IPRP for PCT/IB2009/051831 dated Nov. 9, 2010, with Written Opinion.
IPRP for PCT/US2008/085736 dated Jun. 7, 2011, with Written Opinion.
IPRP for PCT/IB2010/052287 dated Nov. 22, 2011, with Written Opinion.
ISR for PCT/IB2010/052413 dated Sep. 7, 2010.
UK Intellectual Property Office, Application No. GB1109618.7, Patents Act 1977, Examination Report Under Section 18(3), Sep. 16, 2011.
UK Intellectual Property Office, Patents Act 1977: Patents Rules Notification of Grant: Patent Serial No. GB2480015, Nov. 29, 2011.
Walker, et al. "PV String Per-Module Maximum Power Point Enabling Converters", School of Information Technology and Electrical Engineering The University of Queensland, Sep. 28, 2003.
Walker, "Cascaded DC-DC Converter Connection of Photovoltaic Modules", 33rd Annual IEEE Power Electronics Specialists Conference. PESC 2002. Conference Proceedings. CAIRNS, Queensland, Australia, Jun. 23-27, 2002; [Annual Power Electronics Specialists Conference], New York, NY: IEEE US, vol. 1, 23 Jun. 23, 2002, pp. 24-29, XP010596060 ISBN: 978-0-7803-7262-7, figure 1.
Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.
Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.
Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.
Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.
Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.

\* cited by examiner

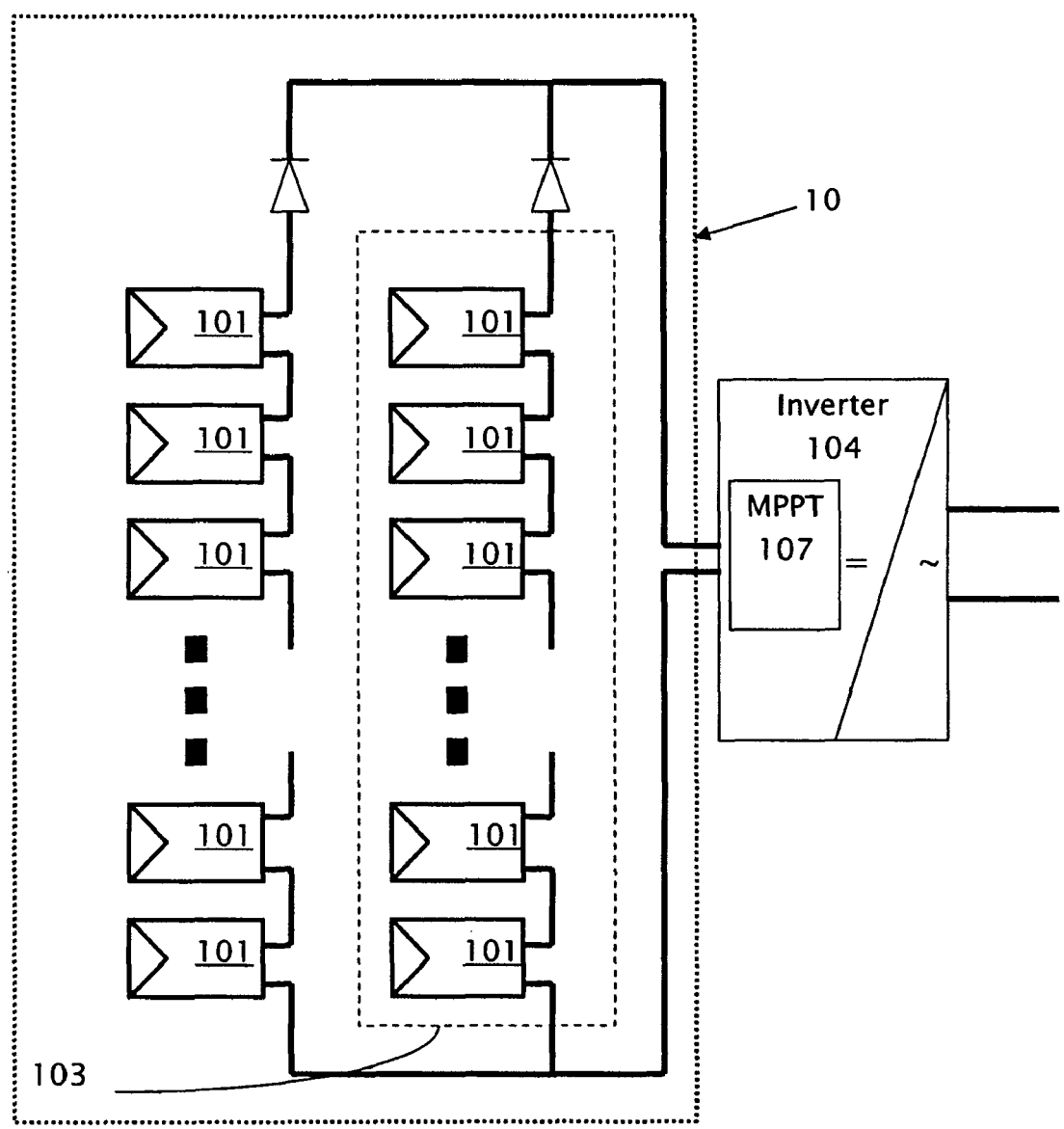
Figure 1 – Conventional Art

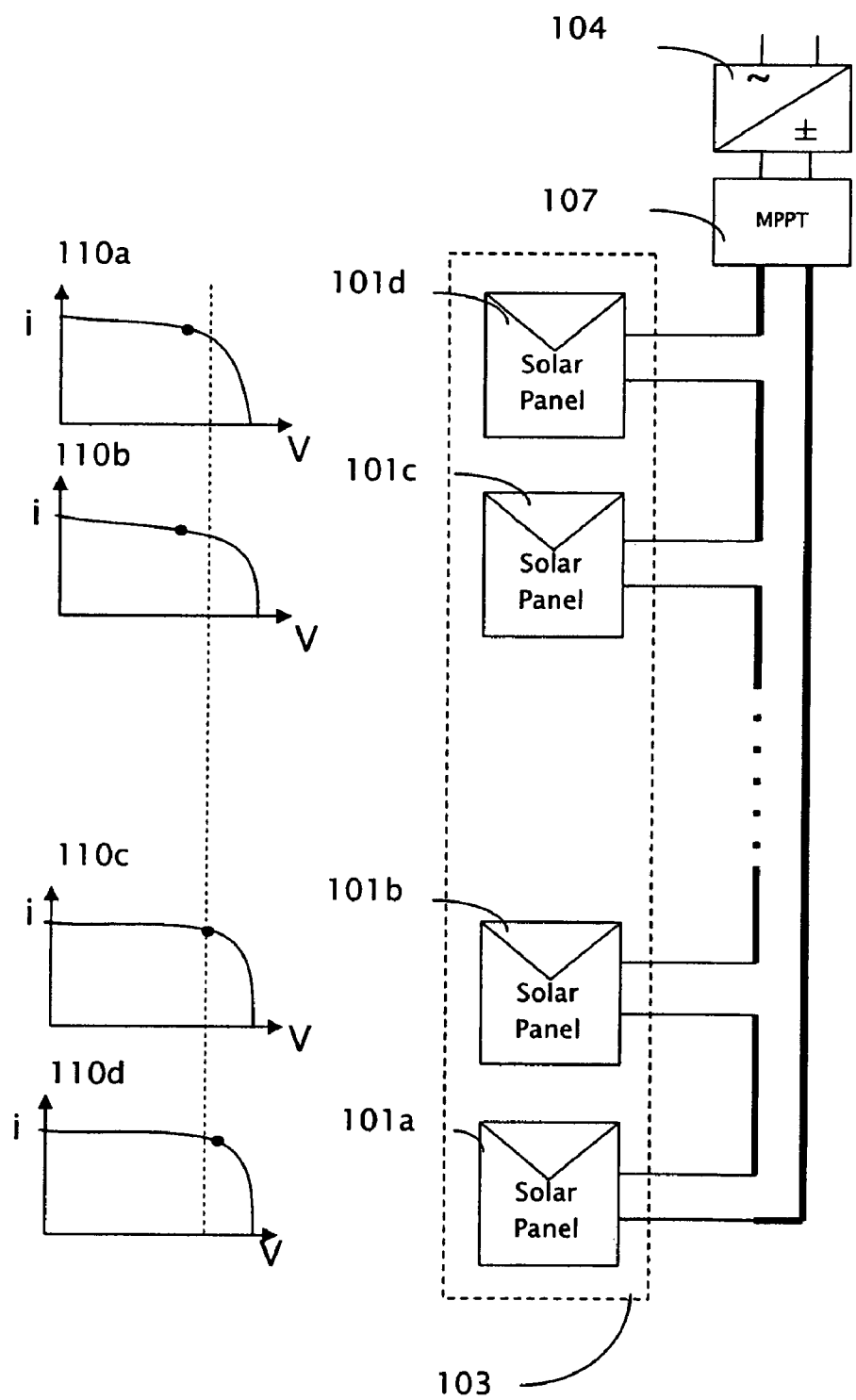
Figure 1B – Conventional Art

PARALLEL CONNECTED INVERTERS

CROSS REFERENCE TO RELATED APPLICATIONS

The present application claims priority benefit from U.S. Application Ser. No. 60/992,589, filed on Dec. 5, 2007, the disclosure of which is incorporated herein by reference in its entirety.

TECHNICAL FIELD

The present invention relates to distributed power systems and, more particularly, a system and method for sharing power inversion/conversion between parallel connected power inverters/converters connected to the distributed power system.

DESCRIPTION OF RELATED ART

A conventional installation of a solar distributed power system 10, including multiple solar panels 101, is illustrated in FIG. 1. Since the voltage provided by each individual solar panel 101 is low, several panels 101 are connected in series to form a string 103 of panels 101. For a large installation, when higher current is required, several strings 103 may be connected in parallel to form overall system 10. The interconnected solar panels 101 are mounted outdoors, and connected to a maximum power point tracking (MPPT) module 107 and then to an inverter 104. MPPT 107 is typically implemented as part of inverter 104 as shown in FIG. 1. The harvested power from DC sources 101 is delivered to inverter 104, which converts the direct-current (DC) into alternating-current (AC) having a desired voltage and frequency, which is usually 110V or 220V at 60 Hz, or 220V at 50 Hz. The AC current from inverter 104 may then be used for operating electric appliances or fed to the power grid.

As noted above, each solar panel 101 supplies relatively very low voltage and current. A problem facing the solar array designer is to produce a standard AC current at 120V or 220V root-mean-square (RMS) from a combination of the low voltages of the solar panels. The delivery of high power from a low voltage requires very high currents, which cause large conduction losses on the order of the second power of the current $i^2$. Furthermore, a power inverter, such as inverter 104, which is used to convert DC current to AC current, is most efficient when its input voltage is slightly higher than its output RMS voltage multiplied by the square root of 2. Hence, in many applications, the power sources, such as solar panels 101, are combined in order to reach the correct voltage or current. A large number of panels 101 are connected into a string 103 and strings 103 are connected in parallel to power inverter 104. Panels 101 are connected in series in order to reach the minimal voltage required for inverter 104. Multiple strings 103 are connected in parallel into an array to supply higher current, so as to enable higher power output.

FIG. 1B illustrates one serial string 103 of DC sources, e.g., solar panels 101a-101d, connected to MPPT circuit 107 and inverter 104. The current (ordinate) versus voltage (abscissa) or IV characteristics are plotted (110a-110d) to the left of each DC source 101. For each DC power source 101, the current decreases as the output voltage increases. At some voltage value, the current goes to zero, and in some applications the voltage value may assume a negative value, meaning that the source becomes a sink. Bypass diodes (not shown) are used to prevent the source from becoming a sink. The power output of each source 101, which is equal to the product of current and voltage (P=i*V), varies depending on the voltage drawn from the source. At a certain current and voltage, close to the falling off point of the current, the power reaches its maximum. It is desirable to operate a power generating cell at this maximum power point (MPP). The purpose of the MPPT is to find this point and operate the system at this point so as to draw the maximum power from the sources.

In a typical, conventional solar panel array, different algorithms and techniques are used to optimize the integrated power output of system 10 using MPPT module 107. MPPT module 107 receives the current extracted from all of solar panels 101 together and tracks the maximum power point for this current to provide the maximum average power such that if more current is extracted, the average voltage from the panels starts to drop, thus lowering the harvested power. MPPT module 107 maintains a current that yields the maximum average power from system 10.

However, since power sources 101a-101d are connected in series to single MPPT 107, MPPT 107 selects a maximum power point which is some average of the maximum power points of the individual serially connected sources 101. In practice, it is very likely that MPPT 107 would operate at an I-V point that is optimum for only a few or none of sources 101. In the example of FIG. 1B, the selected point is the maximum power point for source 101b, but is off the maximum power point for sources 101a, 101c and 101d. Consequently, the arrangement is not operated at best achievable efficiency.

The present applicant has disclosed in co-pending U.S. application Ser. No. 11/950,271 entitled "Distributed Power Harvesting Systems Using DC Power Sources", the use of an electrical power converter, e.g. DC-to-DC converter, attached to the output of each power source, e.g. photovoltaic panel. The electrical power converter converts input power to output power by monitoring and controlling the input power at a maximum power level.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Aspects of the invention provide load balancing of a parallel connected power converter, wherein each converter autonomously determine its own power conversion load.

According to an embodiment of the present invention there is provided a distributed power system including a direct current (DC) power source and multiple inverters. The inverter inputs are adapted for connection in parallel to the DC power source. The inverter outputs adapted for connection in parallel. Multiple control modules connect respectively to the inverters' inputs. The control modules respectively control current drawn by the inverters from the DC input responsive to either the voltage or power of the DC input so that a voltage or power equilibrium, i.e., specified draw, is reached in the DC input. That is, the control module continuously monitors the power provided by the DC power source and adjust the current or power conversion of the power converter according to a specified function. Consequently, the inverters share the load of inverting power from the DC power source to output power. A power module may be attached between the DC power source and the inverters and include an input coupled to said DC power source and an output to the inverter inputs. The power module may be configured to maintain maximum peak power at the input coupled to the DC power source or the power module may be configured to control at maximum peak power at its output. Alternatively, a single maximum peak power tracking module connects the DC power source to the control modules. The control modules include a voltage loop block which upon comparing the voltage of the serial string to a previously specified reference voltage, outputs a current reference signal based on the comparison. A current loop block compares the current reference signal with a current signal proportional to the current in the DC power source.

According to embodiments of the present invention there is provided a method for sharing load in a distributed power system. Multiple inverters are coupled in parallel to the DC power source. The inverters invert power from the DC power source to an output power. Current drawn by the inverters from the DC power source is autonomously controlled by each inverter responsive to selectably either the voltage or power of the DC input. In this manner, the inverters share the load of the inverting power from the DC power source to the output power according to a prescribed power conversion sharing function. A power module disposed between the DC power source and the inverters includes an input coupled to the DC power source and an output to inputs of the inverters. The power module optionally maintains maximum peak power at the input coupled to the DC power source.

According to another embodiment of the present invention there is provided a distributed power system including a direct current (DC) power source and multiple power converters. The power converter inputs are adapted for connection in parallel to the DC power source. The power converter outputs are adapted for connection in parallel. Multiple control modules connect respectively to the power converter's inputs. The control modules respectively control current drawn by the power converters from the DC input responsive to either the voltage or power of the DC input until either a voltage or power equilibrium is reached in the DC input. The power converters share the load of inverting power from the DC power source to output power.

According to embodiments of the present invention there is provided a method for sharing load in a distributed power system. Current drawn from a DC input by the inverters is individually controlled by each inverter responsive to the DC input. An equilibrium is reached in the DC input for each given DC power input, such that DC power conversion is shared among the inverters according to a prescribed formula. The inverter autonomously draws a portion of the load of inverting power from the DC input to output power.

The foregoing and/or other aspects will become apparent from the following detailed description when considered in conjunction with the accompanying drawing figures.

BRIEF DESCRIPTION OF THE DRAWINGS

The accompanying drawings, which are incorporated in and constitute a part of this specification, exemplify embodiments of the present invention and, together with the description, serve to explain and illustrate principles of the invention. The drawings are intended to illustrate various features of the illustrated embodiments in a diagrammatic manner. The drawings are not intended to depict every feature of actual embodiments nor relative dimensions of the depicted elements, and are not necessarily drawn to scale.

The invention is herein described, by way of example only, with reference to the accompanying drawings, wherein:

FIGS. 1 and 1B are block diagram of conventional power harvesting systems using photovoltaic panels as DC power sources;

DETAILED DESCRIPTION

Figure 2:
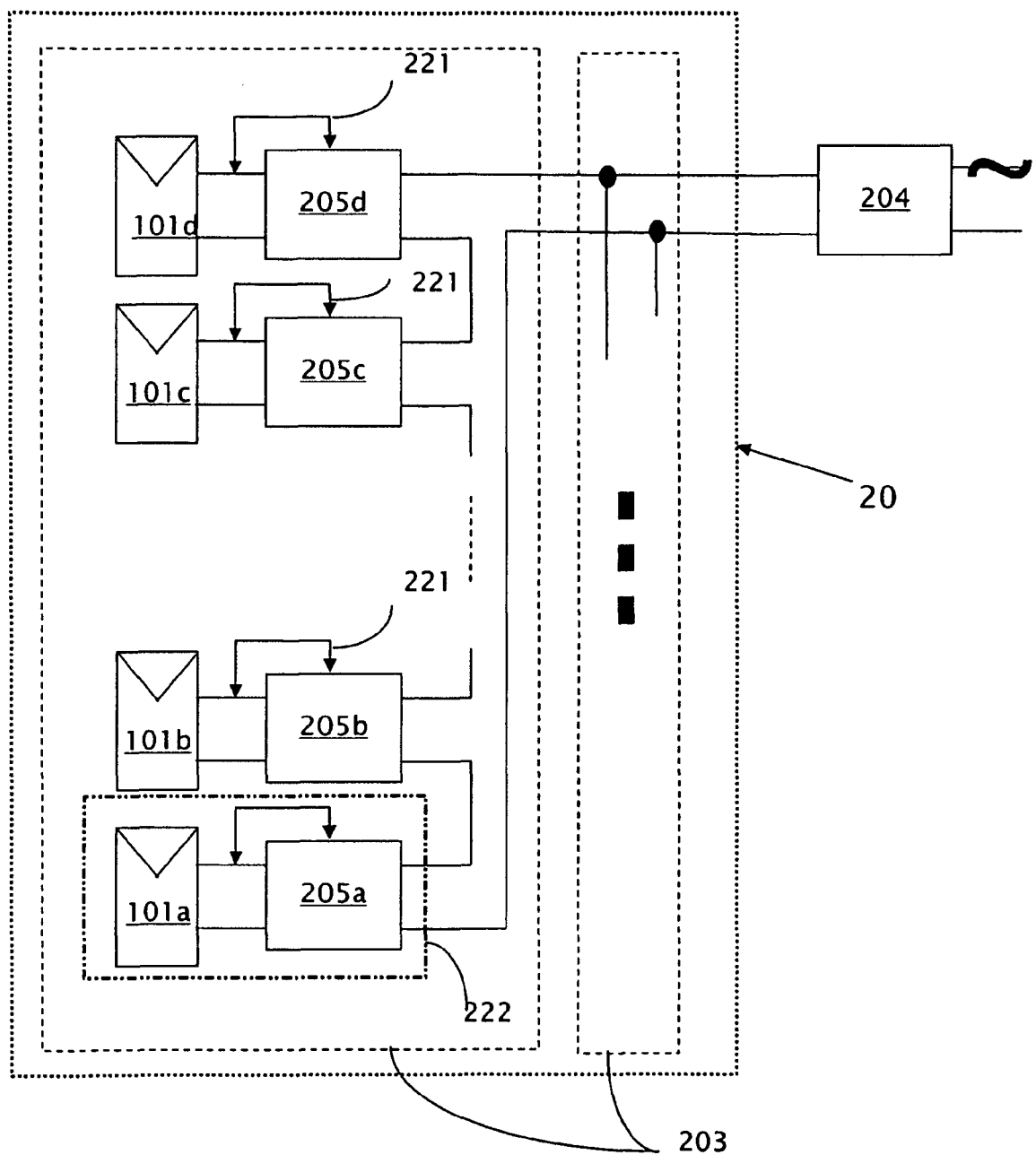
FIG. 2 illustrates a distributed power harvesting circuit, based on the disclosure of U.S. application Ser. No. 11/950,271.

Reference will now be made in detail to embodiments of the present invention, examples of which are illustrated in the accompanying drawings, wherein like reference numerals refer to the like elements throughout. The embodiments are described below to explain the present invention by referring to the figures.

It should be noted, that although the discussion herein relates primarily to photovoltaic systems and more particularly to those systems previously disclosed in U.S. application Ser. No. 11/950,271, the present invention may, by non-limiting example, alternatively be configured as well using conventional photovoltaic distributed power systems and other distributed power systems including (but not limited to) wind turbines, hydroturbines, fuel cells, storage systems such as battery, super-conducting flywheel, and capacitors, and mechanical devices including conventional and variable speed diesel engines, Stirling engines, gas turbines, and micro-turbines.

By way of introduction, distributed power installations have inverters which invert DC power to AC power. In large scale installations, a large inverter may be used, but a large inverter is more difficult to maintain and repair, leading to long downtime. The use of a number of small inverters has a benefit of modularity. If one inverter constantly is operating and a second inverter begins to operate when there is a larger load to handle, there is more wear on the working inverter. Hence load balancing between the inverters is desired. If the control of the two inverters is through a master/slave technique there is an issue of a single point of failure. The single master may break down and take the rest of the system out of whack. A good solution would be a load-balancing, not master-slave driver modular inverter. This disclosure shows a system and method for doing so. To be sure, in the context of this disclosure, load balancing does not necessarily mean that the load is spread among the converters in equal amounts, but rather that the load is distributed among the converters such that each converter assumes a certain part of the load, which may be predetermined or determined during run time.

It should be noted, that although the discussion herein relates primarily to grid tied power distribution systems and consequent application to inversion (i.e. power conversion from direct current (DC) to alternating current (AC), the teachings of the present invention are equally applicable to DC-DC power conversion systems such as are applicable in battery storage/fuel cell systems. Hence the terms "inverter" and "converter" in the present context represent different equivalent embodiments of the present invention.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 2 which illustrates a distributed power harvesting circuit 20, based on the disclosure in U.S. application Ser. No. 11/950,271. Circuit 20 enables connection of multiple distributed power sources, for example solar panels 101a-101d, to a single power supply. Series string 203 of solar panels 101 may be coupled to an inverter 204 or multiple connected strings 203 of solar panels 101 may be connected to a single inverter 204. In configuration 20, each solar panel 101a-101d is connected individually to a separate power converter circuit or a module 205a-205d. Each solar panel 101 together with its associated power converter circuit 205 forms a power source or power generating element 222. (Only one such power generating element 222 is marked in FIG. 2.) Each converter 205a-205d adapts optimally to the power characteristics of the connected solar panel 101a-101d and transfers the power efficiently from input to output of converter 205. Converters 205a-205d are typically microprocessor controlled switching converters, e.g. buck converters, boost converters, buck/boost converters, flyback or forward converters, etc. The converters 205a-205d may also contain a number of component converters, for example a serial connection of a buck and a boost converter. Each converter 205a-205d includes a control loop 221, e.g. MPPT loop that receives a feedback signal, not from the converter's output current or voltage, but rather from the converter's input coming from solar panel 101. The MPPT loop of converter 205 locks the input voltage and current from each solar panel 101a-101d at its optimal power point, by varying one or more duty cycles of the switching conversion typically by pulse width modulation (PWM) in such a way that maximum power is extracted from each attached panel 101a-101d. The controller of converter 205 dynamically tracks the maximum power point at the converter input. Feedback loop 221 is closed on the input power in order to track maximum input power rather than closing a feedback loop on the output voltage as performed by conventional DC-to-DC voltage converters.

As a result of having a separate MPPT circuit in each converter 205a-205d, and consequently for each solar panel 101a-101d, each string 203 may have a different number or different specification, size and/or model of panels 101a-101d connected in series. System 20 of FIG. 2 continuously performs MPPT on the output of each solar panel 101a-101d to react to changes in temperature, solar radiance, shading or other performance factors that effect one or more of solar panels 101a-101d. As a result, the MPPT circuit within the converters 205a-205d harvests the maximum possible power from each panel 101a-101d and transfers this power as output regardless of the parameters effecting other solar panels 101a-101d. The outputs of converters 205a-205d are series connected into a single DC output that forms the input to inverter 204. Inverter 204 converts the series connected DC output of converters 205a-205d into an AC power supply.

Figure 3:
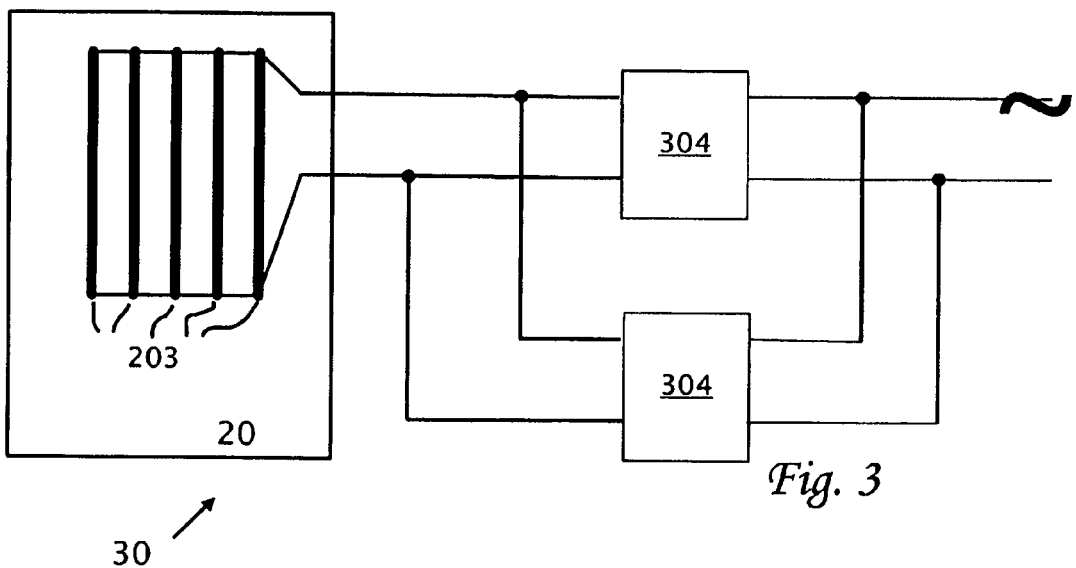
FIG. 3 illustrates a simplified system, according to an embodiment of the present invention.

Reference is now made to FIG. 3 which illustrates a simplified system 30, according to an embodiment of the present invention. A solar panel array 20 in different embodiments may have serial and/or parallel power generating modules 222, each of which includes solar panel 101 and MPPT power converter 205. In system 30, five strings 203 are connected in parallel. Connected to solar panel array 20 are multiple, e.g. two inverters 304 which are parallel connected both at their inputs and their outputs.

Figure 4:
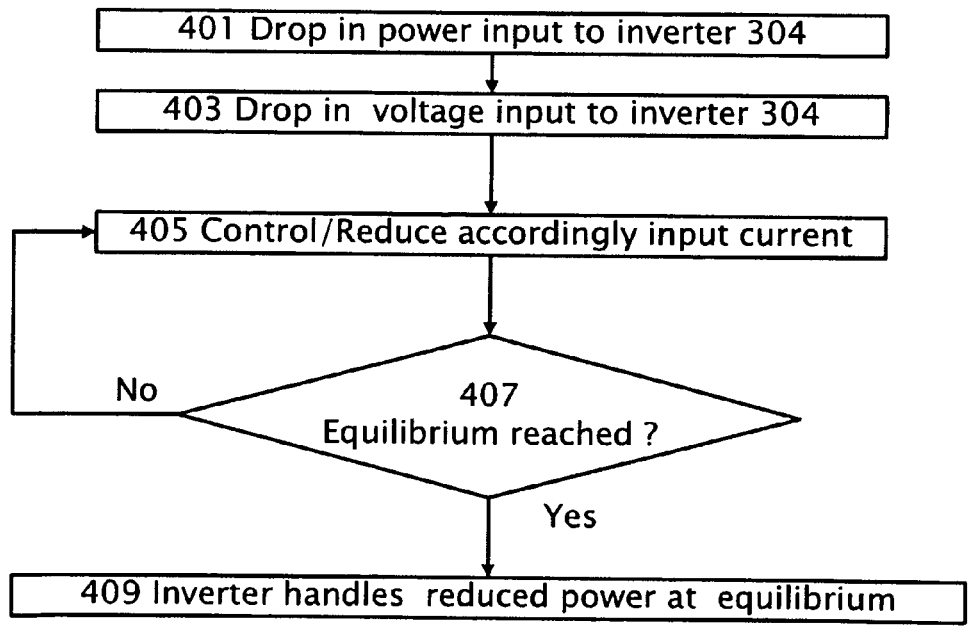
FIG. 4, is a simplified flow diagram of a method, illustrating a feature of the present invention.

Reference is now also made to FIG. 4, a simplified flow diagram illustrating a method 40, according to an embodiment of the present invention. Operation of system 30 is characterized by inverters 304 controlling their input currents based on the voltage input to inverters 304. Under these circumstances, a drop in power (step 401), for instance caused by a cloud moving in front of the sun causes a drop (step 403) in voltage input to inverter 304. The drop (step 403) in voltage input to inverters 304 causes inverters 304 to reduce (step 405) respective input currents which in turn tends to raise the input voltage respectively to inverters 304. An equilibrium is reached (decision box 407) as both inverters 304 handle reduced power (step 409) from solar panel array 20. This process is repeated continuously or intermittently to respond to changes in the operational characteristics of the DC power source.

Figure 7:
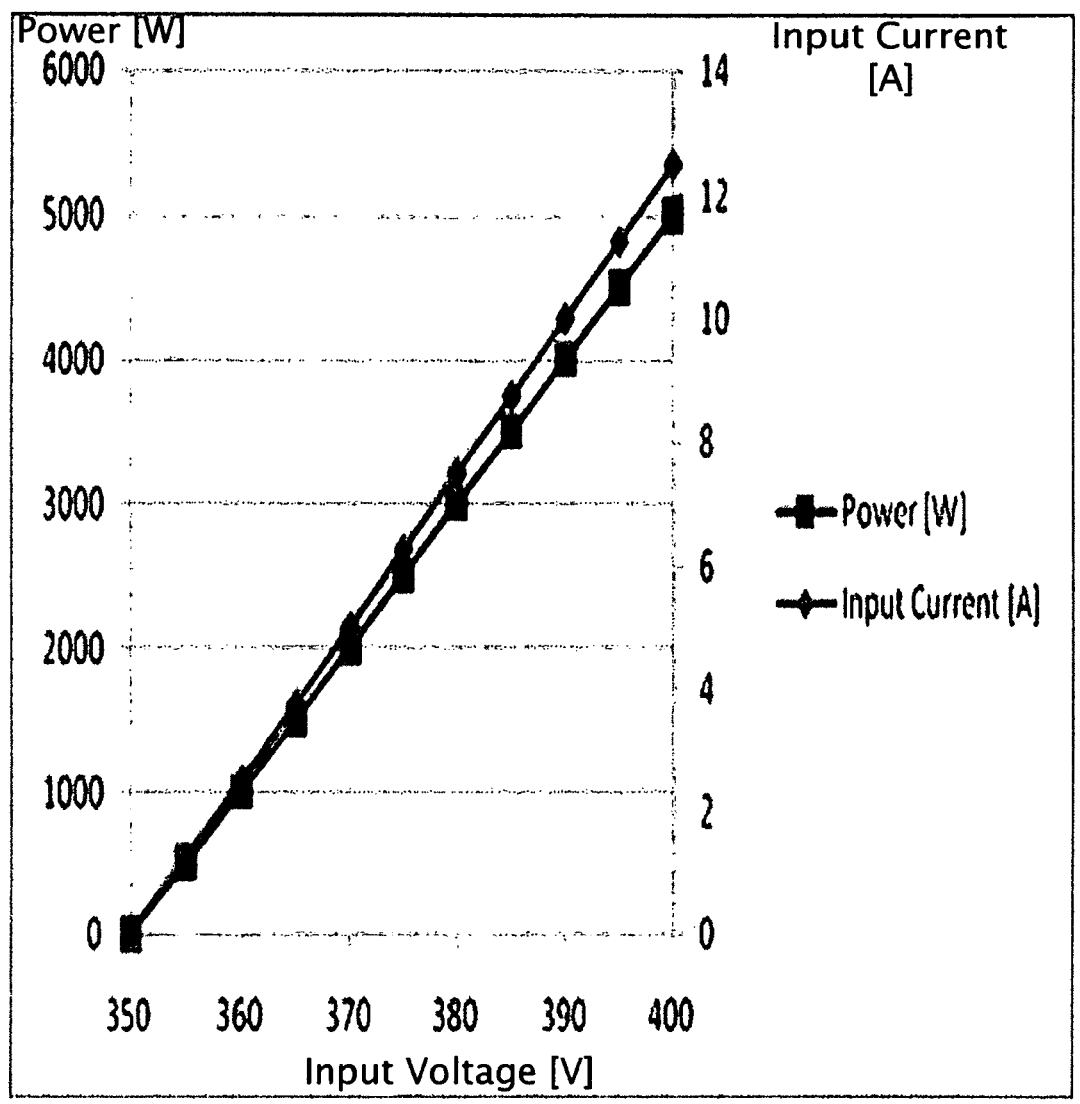
FIG. 7 is a graph showing a typical control current-voltage characteristic for controlling current response to input voltage, according to a feature of the present invention.

Referring back to FIG. 3, in an example of an embodiment of the present invention using solar panel array 20 includes five parallel connected strings 203, each string of ten power generating modules 222 each connected in series to parallel-connected inverters 304 which output a grid voltage of 220V RMS. Nominal input voltage to parallel-connected inverters 304 at maximum power conversion, e.g. 10 kiloWatts, is 400 Volts with 5 kiloWatts through each of two inverters 304. Hence, ignoring power conversion/inversion efficiency losses, each of fifty solar panels 101 output 200 Watt of electrical power at 40 Volts. Current through each string is 2000 W/400V=5 amperes. Power generating modules 222 are configured to maximize their power input (or power output from solar panels 101). Voltage output from power generating modules 222 is typically floating. If the power output from power generating modules 222 decreases (for instance as a result of solar shading, e.g., cloud) input power to inverters 304 drops (step 401). Inverters 304 are configured to adjust their current draw (step 405) based on input voltage. Reference is now made to FIG. 7 a graph showing a typical control current-voltage characteristic for controlling current response to input voltage, according to a feature of the present invention. In the example, the horizontal axis is Voltage in volts and the vertical axes indicate respectively and Power in Watts and Current in amperes. Of course, while in this example a linear function is shown for use by all inverters, other functions may be used and/or each individual inverter may have a different function. According to the graph, 5 kW inverters 304 are configured to draw close to zero Watts at $350V_{DC}$ input, 2.5 kiloWatt at $375 V_{DC}$ input, and the full 5 kiloWatt at $400V_{DC}$ input. In this case, if the direct current power is 10 kiloWatt, each inverter 304 operates at full peak load with an input voltage of $400V_{DC}$ (each inverter 304 drawing each 12.5 ampere, so that total current draft is 25 ampere=10 kiloWatt/400 Volt). If the power input to inverters 304 drops to, e.g., 5 kW total power, both inverters 304 experience a drop in the input voltage (since the DC input is now 5 kW, if inverters 304 keep on drawing 12.5 A each, then the voltage would be 200V). However, each inverter 304 starts reducing its input current until an equilibrium is reached (decision box 407), which in this case is with each inverter 304 drawing 6.25 ampere at 375 VDC input to a total of 2.5 kW power inverted by each inverter 304 and 5 kW for the total both inverters 304.

Figure 5:
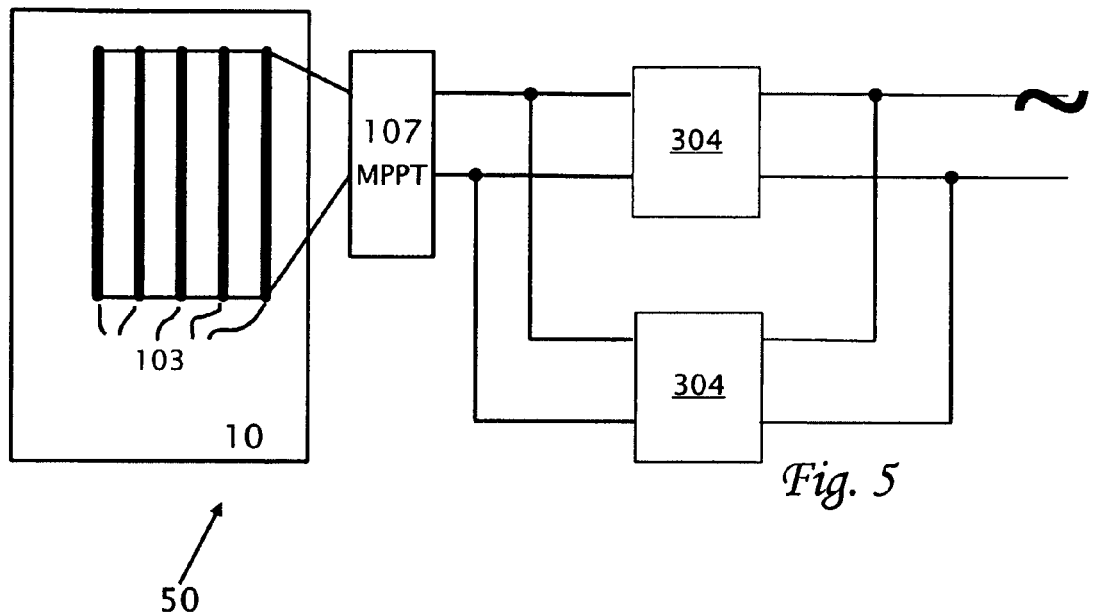
FIG. 5 illustrates a simplified system, according to another embodiment of the present invention.

Reference is now made to FIG. 5 which illustrates a simplified system 50, according to an embodiment of the present invention. A solar panel array 10 in different embodiments may have serial and/or parallel connected solar cells/panels 101. An MPPT power circuit 107 maintains a maximum power output of solar panel array 10 typically by drawing current at the peak power output level of solar panel array 10. The output voltage of MPPT circuit 107 is preferably floating. Connected to MPPT 107 are multiple inverters, e.g. two inverters, 304 which are parallel connected both at their inputs and their outputs.

The operation of system 50 is illustrated by referring back to FIG. 4. If the power output from solar panel array 10 decreases (for instance as a result of solar shading, e.g., cloud) input power to inverters 304 drops (step 401). Inverters 304 are configured to adjust their current draw (step 405) based on input voltage. Each inverter 304 starts reducing (step 405) its input current until an equilibrium is reached (decision box 407) and each inverter 304 handles (step 409) a reduced power load.

Figure 6:
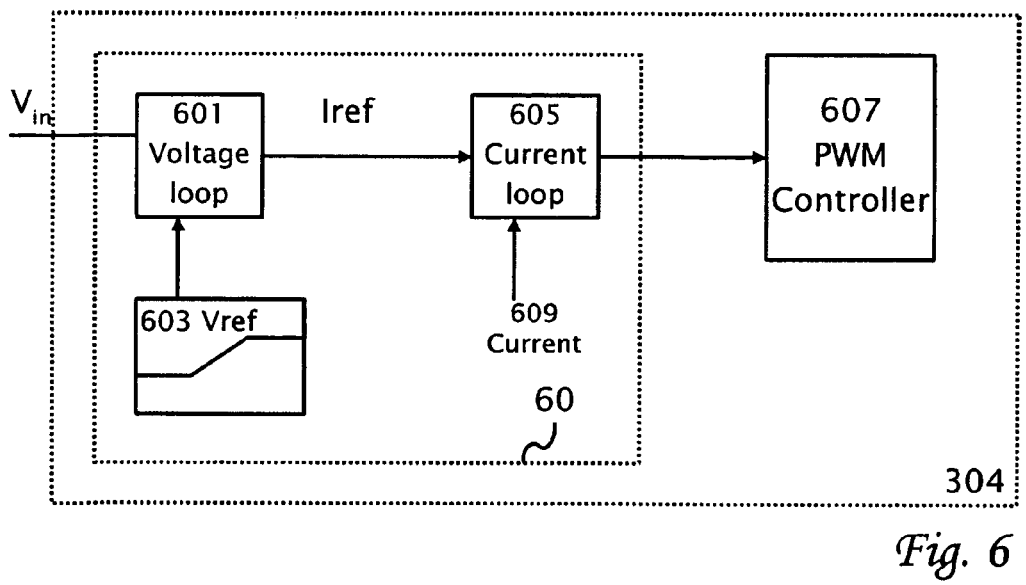
FIG. 6 which illustrates details of a control module integrated inside an inverter, in accordance with different embodiments of the present invention.

Reference is now made to FIG. 6 which illustrates a simplified system diagram of inverter 304 with an integrated control module 60 according to an embodiment of the present invention. Control module 60 includes two control loops a voltage control loop 601 and a current control loop block 605. A previously specified voltage reference block 603 specifies two voltage references, a lower voltage reference and an upper voltage reference. As previously stated, in this example inverter 304 operates with a DC input voltage of 400V in order to invert to 220V RMS. Hence, in this specific example both the lower and upper voltage references are in the vicinity of 400 V DC. In the previous example used in reference to FIG. 3 the lower reference voltage is 350 VDC and the upper reference voltage is 400 VDC. Voltage control loop block 601 compares the actual input DC voltage to the voltage references and outputs a current reference $I_{ref}$ signal. The current reference signal $I_{ref}$ is used as an input to current control loop block 605. Current control loop block 605 receives also a signal 609 proportional to its output current. Typically, a current sensor provides signal 609 from within a pulse width modulation (PWM) block 607 of inverter 304, which performs the power inversion. Current control loop block 605 compares output current signal 609 with the current reference signal $I_{ref}$ and adjusts the output current accordingly until the current (and output power) equilibrate. Thus each inverter 304 typically handles an equal load of power from solar panel array 10 or 20.

As can be understood, in general, embodiments of the invention provide a system whereby a plurality of power converters, e.g., inverters, are connected in parallel and share the power conversion load according to a prescribed function, but each power converter autonomously determines its share of power conversion. That is, each power converter operates according to its own power conversion formula/function, such that overall the parallel-connected converters share the power conversion load in a predetermined manner. That is, while the power conversion sharing scheme is designed according to the system as a whole, i.e., division of duty to all of the converters, each individual inverter operates individually to draw power according to its own formula. In one specific case, e.g., where all of the converters are of the same model and same rating, the formula is the same for all of the converters. On the other hand, in other implementations the formula can be individually tailored to each converter. For example, in installation where one converter has double the conversion capacity as all the other converters in the system, its formula may dictate its power conversion share to be double as the other converters. Also, while the formula exemplified in FIG. 7 is linear, other functions or formulas may be used, as this is given as one particular example.

Figures 8A, 8B:
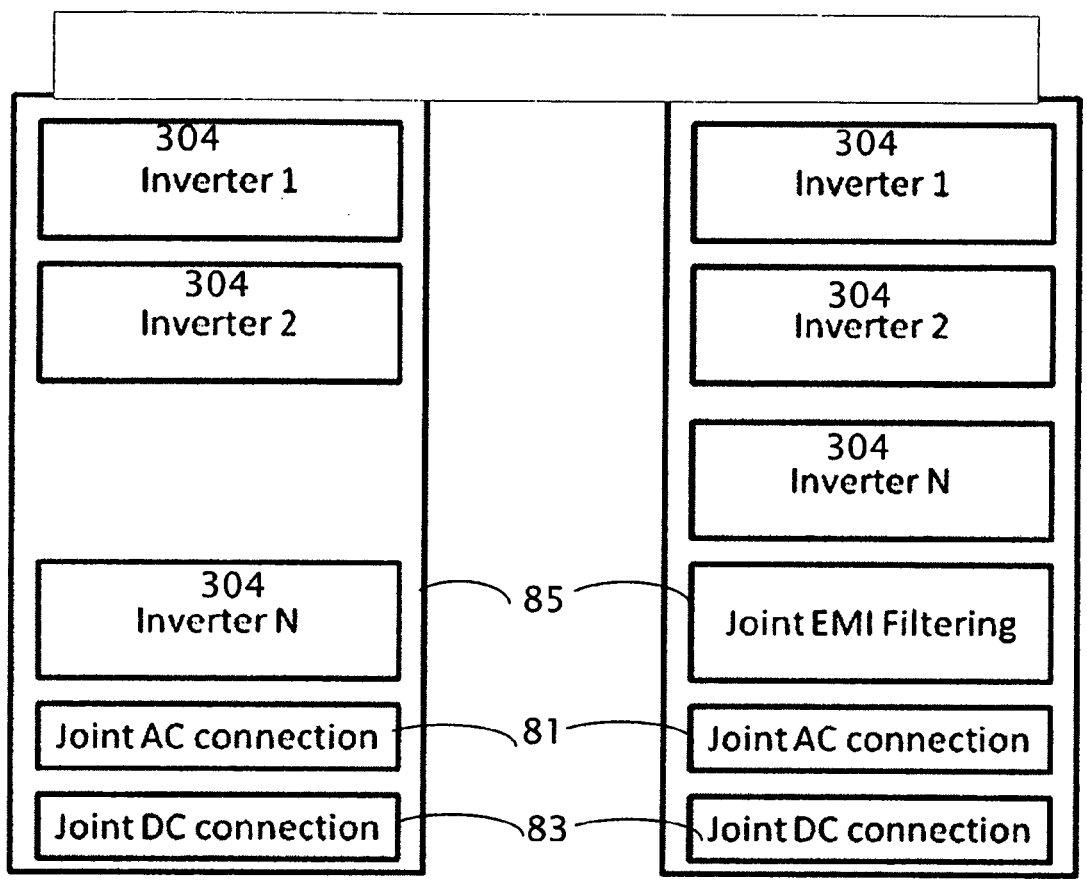
FIGS. 8A and 8B which illustrate racks and connections to the racks with parallel connected inverters, according to a feature of the present invention.

Reference is now made to FIGS. 8A and 8B which illustrate racks with parallel connected inverters, according to a feature of the present invention. In this embodiment some or all of inverters 304 may be configured for operating in a load-balancing mode, according to an embodiment of the present invention, but inverters 304 may actually share some components. One such embodiment might be parallel inverters 304 with a shared enclosure for the electrically separate inverters, as depicted in FIG. 8A. Other embodiments might also include shared electrical elements of the inverters, and example of which as depicted in FIG. 8B which shows parallel connected inverters with a shared EMI/RFI filter bank (these filters might be at the DC input, AC input, or both). Joint connections are shown in the racks, shared by inverters 304, a joint AC connection 81 to the grid and a joint DC connection 83 to DC power source 20. According to a further feature of the present invention, a joint electromagnetic interference filter is used to filter all the outputs of inverters 304 and electromagnetic radiation therefrom, whether they are actually load balancing or not, according to the present invention.

The articles "a", "an", as used hereinafter are intended to mean and be equivalent to "one or more" or "at least one". For instance, "a direct current (DC) power source" means "one or more direct current (DC) power sources".

While the invention has been described with respect to a limited number of embodiments, it will be appreciated that many variations, modifications and other applications of the invention may be made.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the server arts. It is intended that the specification and examples be considered as exemplary only, with a true scope and spirit of the invention being indicated by the following claims.

The invention claimed is:

1. A distributed power system comprising:
   a direct current (DC) power source;
   a plurality of inverters with respective inverter inputs adapted for connection in parallel to said DC power source and with respective inverter outputs adapted for connection in parallel; and
   a plurality of control modules coupled respectively to said inverter inputs and outputs, wherein for each inverter said respective control module includes:
   (i) a voltage loop block configured to sense a voltage at the input and to compare the voltage at the input to at least one previously specified reference voltage and to output a current reference signal based on the comparison; and
   (ii) a current loop block configured to sense an input current to the inverter and to compare said current reference signal with a current signal proportional to the input current of the inverter to adjust the input current until an input power equilibrates.

2. The distributed power system according to claim 1, further comprising:
a power module having an input coupled to said DC power source and an output coupled to said inverter inputs.

3. The distributed power system according to claim 2, wherein said power module is configured to maintain maximum peak power at said input of said power module coupled to said DC power source.

4. The distributed power system according to claim 2, wherein said power module is configured to control at maximum peak power at said output of said power module to said inverter inputs.

5. The distributed power system according to claim 1, further comprising:
a single maximum peak power tracking module connecting said DC power source to said control modules.

6. In a distributed power system including:
a direct current (DC) power source;
a plurality of inverters with respective inverter inputs adapted for connection in parallel to the DC power source and with respective inverter outputs adapted for connection in parallel; a method comprising the steps of:
the inverters inverting power from the DC power source to an output power; and
for each inverter, sensing a current and a voltage at the input of the inverter,
comparing the voltage at the input of the inverter to at least one previously specified reference voltage to produce a voltage comparison,
outputting a current reference signal based on the voltage comparison,
comparing the current reference signal with a current signal proportional to the input current of the inverter, and
adjusting the input current until an input power equilibrates.

7. The method according to claim 6, further comprising the step of:
maintaining maximum peak power at said inverter inputs coupled to said DC power source.

8. The method of claim 6, further comprising the steps of:
autonomously controlling current drawn by each of said inverters from a DC input, wherein said controlling current is responsive to said DC input; to thereby reach an equilibrium in said DC input, whereby each inverter autonomously draws a portion of a load of inverting power from said DC input to output power to distribute the load.

9. A distributed power system comprising:
a direct current (DC) power source;
a plurality of power converters with respective power converter inputs adapted for connection in parallel to said DC power source and with respective power converter outputs adapted for connection in parallel; and
a plurality of control modules connected respectively to said power converter inputs and outputs,
wherein for each converter said respective control module includes:
(i) a voltage loop block configured to sense a voltage at the input and to compare the voltage at the input to at least one previously specified reference voltage and to output a current reference signal based on the comparison; and
(ii) a current loop block configured to sense an input current to the converter and to compare said current reference signal with a current signal proportional to the input current of the converter to adjust the input current until an input power equilibrates.

10. The distributed power system of claim 9, wherein the plurality of power converters comprise a plurality of inverters.

11. The distributed power system of claim 9, wherein each of the plurality of control modules vary the current draw of the respective converter according to one of DC power or DC voltage provided by the DC power source.

12. The distributed power system of claim 9, wherein each of the plurality of control modules vary the current draw of the respective converter so as to maintain a functional relationship between said input current and said input voltage of said respective converter.

13. The distributed power system of claim 12, wherein the functional relationship is the same for all of the control modules.

14. The distributed power system of claim 9, wherein the DC power source comprises a plurality of power generating elements coupled to provide a single DC power output.

15. A system for controlling load balancing of a plurality of inverters with respective DC inputs adapted for connection in parallel to a DC power source, the system comprising:
for each of the inverters, a control module operatively attached to the inverters, wherein the control module is configured for individually controlling current drawn by each one of said inverters from the respective DC input, wherein said controlling current is responsive to said respective DC input;
whereby the inverter is configured to autonomously draw a portion of a load of inverting power from said respective DC input and convert said portion to output power, while avoiding master/slave control between the control modules; and
wherein for each inverter said control module includes:
(i) a voltage loop block configured to sense the voltage at the input and to compare the voltage at the input to at least one previously specified reference voltage and to output a current reference signal based on the comparison; and
(ii) a current loop block configured to sense the input current to the inverter and to compare said current reference signal with a current signal proportional to the input current of the inverter to adjust the input current until the input power equilibrates.

* * * * *

UNITED STATES PATENT AND TRADEMARK OFFICE
CERTIFICATE OF CORRECTION

PATENT NO. : 8,289,742 B2  
APPLICATION NO. : 12/329520  
DATED : October 16, 2012  
INVENTOR(S) : Meir Adest et al.

Page 1 of 1

It is certified that error appears in the above-identified patent and that said Letters Patent is hereby corrected as shown below:

On the Title Page, Item 56

Page 5, Column 1, Other Publications, Line 39:
 Delete "Instutte" and insert --Institute--

Page 5, Column 1, Other Publications, Line 44:
 Delete "Coupany" and insert --Company--

In the Specification

Column 2, Line 51:
 Delete "determine" and insert --determines--

Column 8, Line 26:
 Delete "thereform" and insert --therefrom--

Signed and Sealed this
Seventh Day of April, 2015

Michelle K. Lee
*Director of the United States Patent and Trademark Office*